(12) United States Patent
Guicquero et al.

(10) Patent No.: US 9,942,490 B2
(45) Date of Patent: Apr. 10, 2018

(54) COMPRESSIVE IMAGE SENSING DEVICE AND METHOD

(71) Applicant: COMMISSARIAT A L'ENERGIE ATOMIQUE ET AUX ENERGIES ALTERNATIVES, Paris (FR)

(72) Inventors: William Guicquero, Bures sur Yvette (FR); Antoine Dupret, Orsay (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 14/481,632

(22) Filed: Sep. 9, 2014

(65) Prior Publication Data
US 2015/0070541 A1  Mar. 12, 2015

(30) Foreign Application Priority Data

Sep. 10, 2013 (FR) ...................... 13 58672
Sep. 8, 2014 (EP) ..................... 14183973

(51) Int. Cl.
| | | |
|---|---|---|
| H04N 5/335 | (2011.01) | |
| H04N 5/341 | (2011.01) | |
| H04N 5/343 | (2011.01) | |
| H04N 5/347 | (2011.01) | |
| H04N 5/378 | (2011.01) | |

(52) U.S. Cl.
CPC ............ *H04N 5/341* (2013.01); *H04N 5/343* (2013.01); *H04N 5/347* (2013.01); *H04N 5/378* (2013.01)

(58) Field of Classification Search
CPC ..................................... H04N 5/341
USPC ......................................................... 348/294
See application file for complete search history.

(56) References Cited

U.S. PATENT DOCUMENTS

| | | | |
|---|---|---|---|
| 6,417,882 B1 | 7/2002 | Mahant-Shetti | |
| 2006/0197007 A1* | 9/2006 | Iwabuchi et al. | 250/208.1 |
| 2008/0218610 A1* | 9/2008 | Chapman et al. | 348/246 |
| 2011/0315855 A1 | 12/2011 | Perlman et al. | |
| 2013/0011051 A1 | 1/2013 | Bottisti et al. | |

FOREIGN PATENT DOCUMENTS

| | | |
|---|---|---|
| CN | 102186025 B | 9/2011 |
| WO | 2011103601 A2 | 8/2011 |
| WO | 2012044380 A2 | 4/2012 |

OTHER PUBLICATIONS

Robucci, et al., "Compressive Sensing on a CMOS Separable-Transform Image Sensor", Proceedings of the IEEE, vol. 98, No. 6, 1089-1101, (Apr. 22, 2010).

(Continued)

*Primary Examiner* — Stephen Coleman
(74) *Attorney, Agent, or Firm* — Kevin R. Erdman; Brannon Sowers & Cracraft PC

(57) ABSTRACT

The present invention involves a CMOS image sensor including: a plurality of pixels distributed in a plurality of subsets, each subset defining a measurement support; and a circuit capable of implementing a compressive image sensing method, the method including: for a given integration time of the sensor pixels, reading, for each measurement support, a single output value based on the output values of a pseudo-random selection of one or a plurality of pixels of the support.

20 Claims, 4 Drawing Sheets

(56) References Cited

OTHER PUBLICATIONS

Duarte, et al., "Single-Pixel Imaging via Compressive Sampling", IEEE Signal Processing Magazine, 83-91, (Mar. 2008).
Tang, et al., "A Low Power Linear Output Current-Mediated CMOS Imager", Hong Kong University of Science and Technology, Hong Kong, China (Jul. 2009).
Majidzadeh, et al., "A (256×256) Pixel 76.7mW CMOS Imager/Compressor Based on Real-Time In-Pixel Compressive Sensing", (Feb. 2010).
Tang, et al., "A 4T Low-Power Linear-Output Current-Mediated CMOS Image Sensor", IEEE Transactions on Very Large Scale Integration (VLSI) Systems, vol. 19, No. 9, 1559-1568 (Sep. 2011).
Search Report for French Application 13/58672 filed Sep. 10, 2013, "Institut National de la Propriete Industrielle" (May 9, 2014).

* cited by examiner

COMPRESSIVE IMAGE SENSING DEVICE AND METHOD

CROSS-REFERENCE TO RELATED APPLICATIONS

This application claims the priority benefit of French Patent application number 13/58672, filed on Sep. 10, 2013, the disclosures and contents of which are hereby incorporated by reference herein in their entirety to the maximum extent allowable by law.

BACKGROUND OF THE INVENTION

The present disclosure generally relates to CMOS image sensors, and more specifically aims at the implementation of compressive sensing methods in a CMOS image sensor.

A CMOS image sensor generally comprises a plurality of pixels arranged in rows and in columns. Each pixel comprises a photodiode used in reverse mode, having its junction capacitance discharged by a photocurrent according to a received light intensity. The measurement of the illumination level received by a pixel is performed by measuring a quantity representative of the voltage across the photodiode at selected times, including the end of a so-called integration period, before and after which the pixel is reset by recharging of its photodiode.

Conventionally, in an image acquisition phase, for each pixel of the sensor, an output value representative of the illumination level received by the pixel during the integration is read, digitized, and stored in digital form. To decrease the quantity of digital data to be stored/processed downstream of the sensor, the acquisition phase is often followed by a phase of compressing the digitized image.

This conventional method of acquiring an entire digitized image, followed by a phase of compressing the digitized image, has several disadvantages. In particular, acquiring an entire digitized image is relatively long, which is a limitation for the increase of image acquisition rates. Further, such an acquisition of an entire digitized image results in a relatively high electric power consumption by the read and analog-to-digital conversion circuits of the sensor. Further, the phase of compressing the digitized image may comprise relatively complex calculations, and implies providing a digital signal processing unit dedicated to such a compression at the sensor output, possibly on the same chip as the sensor. These various disadvantages particularly raise an issue in systems with significant constraints relative to the acquisition and the compression of images in terms of processing speed and/or of electric power consumption.

To attempt partly overcoming these disadvantages, so-called compressive sensing methods have already been provided, where the compression phase is implemented in analog mode, upstream of the analog-to-digital converter(s), in combination with the acquisition phase. Compressive sensing methods enable to acquire and to simultaneously compress the image by providing, instead of reading and digitizing an output value representative of an illumination level individually received by each pixel, to make a plurality of non-coherent measurements, each based on a measurement support comprising a plurality of sensor pixels, for example, all the sensor pixels, or a subset of sensor pixels. Each measurement is a weighted sum of the brightness levels received by the different pixels of a measurement support. The weighting coefficients are randomly or pseudo-randomly generated. These coefficients may be binary (0 or 1), which makes the implementation of the weighted sum operations easier. To obtain a compressive effect, the total number of measurements made on the sensor is smaller than the total number of sensor pixels. It is thus possible to decrease the image acquisition time and the electric power consumption associated with the acquisition, particularly due to the fact that less data are read and digitized by the sensor. Further, digital compressive processing operations, subsequent to the acquisition, may be decreased or suppressed.

The original image can be reconstructed from the compressed image and the array of weighting coefficients used on acquisition. Such a reconstruction uses the sparseness of the original image in a specific decomposition base, for example, in a discrete cosine base or in a wavelet base.

Compressive sensing theories have been discussed in detail in various publications, for example, in article "An Introduction To Compressive Sensing" by Emmanuel J. Candès et al.

Further, CMOS image sensor architectures using compressive sensing have been described in articles "Block-Based Compressive Sensing in a CMOS Image Sensor", by M. R. Dadkhah et al., and "CMOS Image Sensor With Per-Column $\Sigma\Delta$ ADC and Programmable Compressed Sensing" by Yusuke Oike et al.

There however is a need for a CMOS image sensor capable of implementing compressive sensing methods, this sensor at least partly improving certain aspects of prior art sensors. Particularly, there is a need for a CMOS sensor having a higher image acquisition speed and/or having a lower electric consumption, and/or having a decreased bulk as compared with prior art CMOS sensors using compressive sensing.

SUMMARY

Thus, an embodiment provides a CMOS image sensor comprising: a plurality of pixels distributed into a plurality of subsets, each subset defining a measurement support; and a circuit capable of implementing a compressive image sensing method, the method comprising: for a given integration time of the sensor pixels, reading, for each measurement support, a single output value based on the output values of a pseudo-random selection of one or a plurality of pixels of the support.

According to an embodiment, on implementation of the compressive sensing method, the integration periods of the pixels of a same measurement support coincide in time.

According to an embodiment, the single output value is representative of the sum of the output values of the selected pixels of the support.

According to an embodiment, all the pixels of a same measurement support are connected to a same output conductive track.

According to an embodiment, on implementation of the compressive sensing method, the sensor pixels are configured so that, when a plurality of pixels of a same support are simultaneously activated in read mode, a quantity representative of the sum of the output values of the activated pixels can be read from the output track common to the pixels of the support.

According to an embodiment, the quantity is a current.

According to an embodiment, each output track of the sensor is connected to a circuit for reading the quantity.

According to an embodiment, pixels of different measurement supports are connected to different output conductive tracks.

According to an embodiment, the sensor pixels are arranged in an array, and all the pixels of a same measurement support belong to a same column of the array.

According to an embodiment, each columns of the array comprises a plurality of different measurement supports.

According to an embodiment, the pixels of each measurement support are evenly distributed along the entire height of the column to which the support belongs.

According to an embodiment, all the pixels of a same column are connected to a same output conductive track.

According to an embodiment, the pixels are active pixels, each comprising a photodetector and an active output amplifier comprising MOS transistors.

According to an embodiment, each pixel comprises one photodiode and three MOS transistors.

According to an embodiment, the sensor comprises a generator of pseudo-random binary coefficients, and a control circuit capable of performing the pseudo-random selection of one or a plurality of pixels of the supports based on the coefficients provided by the generator.

According to an embodiment, the generator comprises a stage for decreasing its output expectation.

According to an embodiment, the compressive sensing method comprises, for each measurement support, reading at least two output values corresponding to different integration times of the support pixels, where the support pixels are not reset between the two read operations, to enable to reconstruct an image having a wide dynamic range. Another embodiment provides a method of compressive image sensing by a CMOS image sensor comprising a plurality of pixels distributed in a plurality of subsets, each subset defining a measurement support, the method comprising: for a given integration time of the sensor pixels, reading, for each measurement support, a single output value based on the output values of a pseudo-random selection of one or a plurality of pixels of the support.

According to an embodiment, the method comprises, for each measurement support, reading at least two output values corresponding to different integration times of the pixels of the support, where the pixels of the support are not reset between the two read operations, to enable to reconstruct an image having a wide dynamic range.

According to an embodiment, the integration periods of the pixels of a same measurement support coincide in time.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 schematically shows in the form of blocks an embodiment of a CMOS image sensor capable of implementing compressive sensing methods;

Figure 2A:
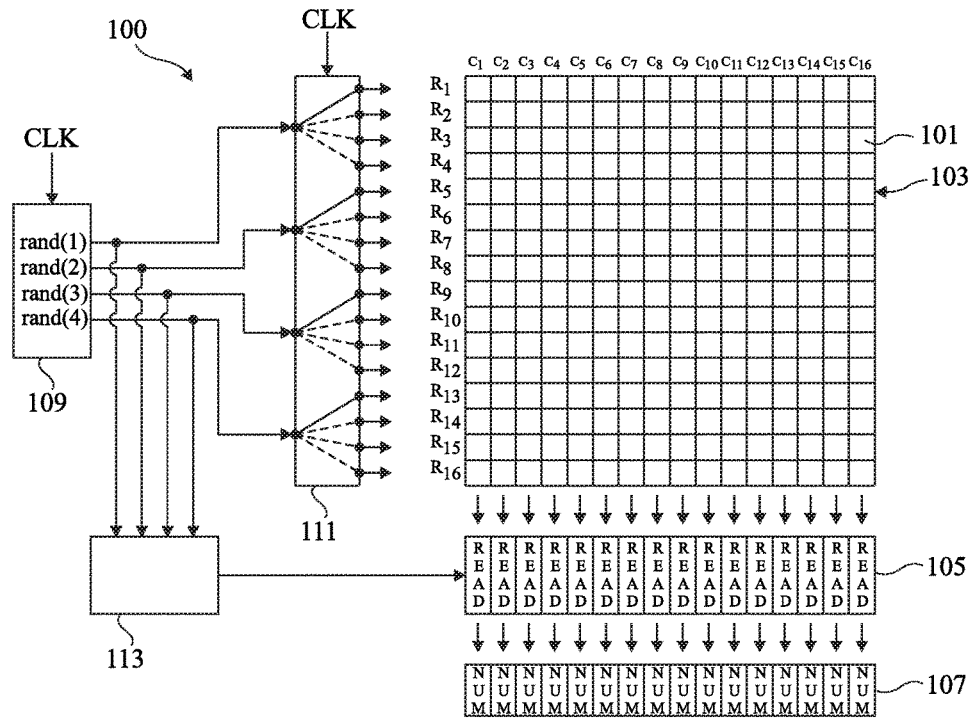
FIGS. 2A and 2B illustrate in further detail the electric diagram and the operation of an embodiment of a pixel of the sensor of FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

For clarity, the same elements have been designated with the same reference numerals in the different drawings. Further, only those elements which are useful to the understanding of the embodiments described hereafter have been detailed. In particular, the methods and devices capable of being used to reconstruct non-compressed images from images captured in compressive sensing have not been detailed, the embodiments of compressive sensing devices and methods described hereafter being compatible with usual reconstruction methods and devices in compressive sensing.

Conventionally, in a CMOS sensor architecture using compressive sensing, the sensor may comprise an array of pixels divided into a plurality of sub-arrays of same dimensions which define measurement supports. On acquisition of an image, it is provided to make a plurality of different measurements on each measurement support, that is, to calculate a plurality of weighted sums of the output values of the support pixels with different sets of weighting coefficients.

To achieve this, it may be provided, before making the measurements, to temporarily store a snapshot of the output values of the pixels in the support, in order to be able to successively perform the different measurements based on the same pixel values. Indeed, the output value of a CMOS pixel generally permanently varies along time, and the storage of a snapshot enables to ascertain that the different measurements made on a given support are based on the same output values of the pixels of the support. A solution of this type is for example described in above-mentioned article "Block-Based Compressive Sensing in a CMOS Image Sensor", by M. R. Dadkhah et al.

However, a disadvantage of such a solution is that the circuits provided to temporarily measure a snapshot of the analog output values of the pixels in the support increase the sensor bulk and cost and have a non-negligible electric power consumption.

As a variation, rather than storing a snapshot of the output values of the pixels of the support, an architecture enabling to calculate in parallel (simultaneously) a plurality of weighted sums of the output values of the pixels of the support, with different weighting coefficients, may be provided. A solution of this type is for example described in above-mentioned article "CMOS Image Sensor With Per-Column ΣΔ ADC and Programmable Compressed Sensing" by Yusuke Oike et al.

However, a disadvantage of this solution is that it implies duplicating certain resources a plurality of times, and particularly the circuits implementing the weighted sum, the connection tracks between the pixels of the support and the circuits implementing the weighted sums, the connection tracks between the weighting coefficient generator and the circuits implementing the weighted sum, etc.

More generally, a disadvantage of existing CMOS sensor architectures implementing compressive sensing methods is that they comprise, as compared with standard CMOS sensors using no compressive sensing, additional circuits significantly increasing the bulk and/or the electric power consumption of the sensor, which at least partly decreases the benefits provided by compressive sensing.

Further, in certain applications, it would be desirable to further decrease the image acquisition time with respect to existing CMOS sensor architectures using compressive sensing.

FIG. 1 schematically shows in the form of blocks an embodiment of a CMOS image sensor 100 capable of implementing compressive sensing methods. It should be noted that in this example, sensor 100 is capable of implementing not only compressive sensing methods, but also methods of acquisition of a non-compressed entire image.

Sensor 100 comprises a plurality of identical pixels 101 arranged in an array 103. In the example of FIG. 1, given for explanation purposes, array 103 comprises 16 rows bearing references $R_1$ to $R_{16}$ (from top to bottom in the orientation of the drawing) and 16 columns bearing references $C_1$ to $C_{16}$ (from left to right in the orientation of the drawing), that is, 256 pixels. The embodiments described hereafter are of course compatible with arrays having different dimensions.

According to an aspect of the described embodiments, the sensor pixels are active pixels, that is, each pixel comprises a photodetector and an active output amplifier based on MOS transistors. The provision of a sensor with active pixels particularly has the advantage of enabling to acquire images having a low noise with respect to a sensor with passive pixels (that is, a sensor where each pixel comprises a photodetector but does not comprise its own output amplifier).

Figure 2B:
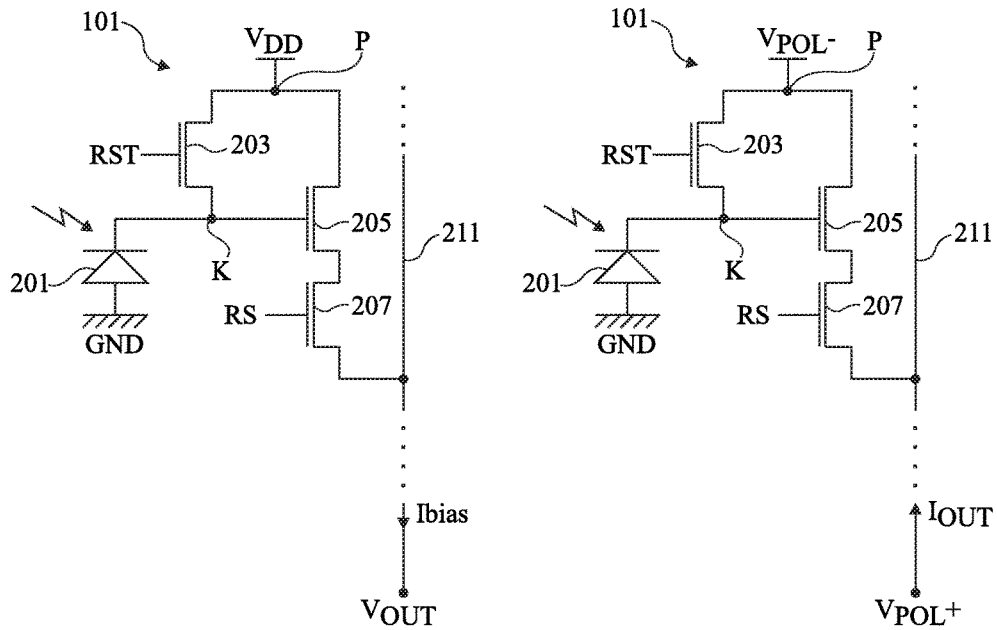

FIGS. 2A and 2B show in further detail the electric diagram of a preferred embodiment of a pixel 101 of sensor 100. FIG. 2A shows pixel 101 when the sensor is configured to implement an example of a method of acquiring a non-compressed entire image, and FIG. 2B shows the same pixel 101 when the sensor is configured to implement an example of compressing image sensing.

Pixel 101 of FIGS. 2A and 2B is a pixel of the type currently called 3T pixel in the art, that is, comprising a photodetector, that is, a photodiode 201 in this example, and three MOS transistors, that is, N-channel transistors 203, 205, and 207 in this example. The anode of photodiode 201 is connected to a low reference voltage node GND of the sensor, for example, ground, and the cathode of photodiode 201 is connected to a storage node K of the pixel. Transistor 203, or reset transistor, connects node K to a node P of application of a pixel biasing voltage, and transistors 205 and 207 connect node K to an output track 211 of the pixel, common to a plurality of pixels of the sensor. Transistor 205 has its gate connected to node K, a first conduction node (source or drain according to the applied biasing) connected to node P, and a second conduction node (drain or source according to the applied biasing) connected to output track 211 via transistor 207 or read transistor. In operation, pixel 101 receives control signals RST and RS respectively applied to the gates of transistors 203 and 207.

In a pixel resetting phase, transistor 203 may be turned on (signal RST in a high state in this example), which causes the resetting of the voltage of node K to the voltage of node P.

During an integration phase of pixel 101 (after a reset phase), transistors 203 and 207 may be maintained off (signals RST and RS in a low state in this example) to isolate storage node K. The electric charges generated in photodiode 201 under the effect of light then cause a progressive decrease of the voltage of node K.

In a phase of acquisition of an output value of the pixel (at the end of an integration phase), transistor 203 may be maintained off (signal RST in the low state) and transistor 207 may be turned on (signal RS in the high state), to enable to read a value representative of the voltage of node K from output track 211 of the pixel.

In the example of FIG. 2A, when sensor 100 is configured to implement the acquisition of a non-compressed entire image, pixels 101 are provided to be configured to enables to read the output voltage values of the pixels from output track(s) 211 of the sensor. To achieve this, in each pixel, node P is set to a high reference voltage $V_{DD}$, greater than low reference voltage GND, for example, a high power supply voltage of the sensor, and output 211 of the pixel is coupled, via a biasing circuit, not shown, to a low reference voltage, for example, voltage GND. Transistor 205 then operates as a follower source. The voltage variations of node K are transferred onto the node common to transistors 205 and 207 and, when transistor 207 is in the on state, onto output track 211 of the pixel. An output value of the pixel is acquired by reading of voltage $V_{OUT}$ of output track 211.

In the example of FIG. 2B, when sensor 100 is configured to implement a method of compressive image sensing, pixels 101 are provided to be configured to enable to read the output current values of the pixels on output track(s) 211 of the sensor. To achieve this, in each pixel, node P is set to a first bias voltage $V_{POL-}$, and output track 211 of the pixel is coupled to a second bias voltage $V_{POL+}$ greater than voltage $V_{POL-}$. Voltages $V_{POL-}$ and $V_{POL+}$ are for example both between voltage GND and voltage $V_{DD}$. When transistor 207 of the pixel is in the on state, and if transistors 207 of the other sensor pixels connected to the same output track 211 are in the off state, current $I_{OUT}$ flowing through output track 211 of the pixel is representative of the voltage of pixel node K. An output value of the pixel may be acquired by reading of current $I_{OUT}$ flowing through output track 211 of the pixel. If a plurality of pixels sharing a same output track 211 are simultaneously activated in read mode (that is, if their read transistors 207 are simultaneously turned on), current $I_{OUT}$ in track 211 is representative of the sum of the voltages of nodes K of these pixels.

According to an aspect of the described embodiments, as will be explained in further detail hereafter by means of non-limiting specific embodiments, it is provided, on implementation of the compressive sensing of an image, to use groups of pixels sharing a same output conductive track 211 as measurement supports, the pixels being configured so that, when a plurality of pixels are simultaneously activated in read mode, it is possible to read, from the output track 211 common to the pixels of the support, an analog quantity representative of the sum of the output values of the pixels activated in read mode.

An advantage is that this enables to perform compressive sensing sums with no additional circuit with respect to a standard CMOS sensor using no compressive sensing.

In the example described in relation with FIG. 2B, the pixels are configured to allow a reading of their output current values from track 211, and the analog quantity representative of the sum of the output values of the simultaneously-activated pixels is a current. It should however be noted that other read modes enabling to automatically sum up the output values of the pixels on output track 211 of the pixels of the support can be envisaged. For example, the pixels may be configured for a reading of charges.

In the example of FIGS. 2A and 2B, it may be passed from the configuration of acquisition of a non-compressed entire image to the compressive sensing configuration by only varying control signals outside of the pixel array. This embodiment enables to preserve the investments necessary to develop a CMOS pixel, already made in the field of CMOS sensors using no compressive sensing.

As a variation, it may be provided, in the operating mode using no compressive sensing, to configure the pixels to allow a read mode other than a voltage reading, for example, a current reading or a charge reading.

It should be noted that when the sensor pixels are configured for a reading of the current, the relation between output current $I_{OUT}$ of a pixel of the sensor and the light intensity received by this pixel, or pixel response, may be either linear, or non-linear according to the characteristics of the pixel transistors and to the biasing levels. The provided compressive sensing methods are compatible with the two types of response (linear or non-linear). It should in particular be noted that known algorithms of reconstruction of non-compressed images from images captured in compressive sensing are capable of taking into account a possible non-linearity of the pixel response.

According to another aspect of the described embodiments, as will be explained in further detail hereafter by means of specific non-limiting embodiments, it is provided, on implementation of the compressive sensing of an image, to perform, for a given integration time of the sensor pixels, a single measurement per support, instead of a plurality of measurements as provided by prior art compressive sensing architectures and methods.

An advantage is that this avoids having to store a snapshot of the output values of the pixel of the support, and having to provide additional circuits and/or routings to calculate in parallel a plurality of weighted sums of the output values of the pixels of the support.

Another advantage is that this provides a particularly high speed of acquisition of the compressed image.

In the following, it will be considered as a non-limiting explicative embodiment that, in sensor 100 of FIG. 1, the outputs of the pixels of a same column of array 103 are connected to a same output track 211, and the outputs of the pixels of different columns of array 103 are connected to different output tracks 211. Further, it will be considered in this example that the pixels of sensor 100 are simultaneously controllable in rows, that is, in each pixel row of array 103, the gates of transistors 203 of the row pixels are connected to a same conductive track (not shown) receiving a control signal RST common to all the pixels in the row, and the gates of transistors 207 of the row pixels are connected to a same conductive track (not shown) receiving a control signal RS common to all the pixels in the row.

At the foot of each column of array 103 is provided a read circuit (READ) capable of reading an analog output value from track 211 common to the column pixels. In this example, each read circuit (READ) is configurable to read either the output voltage value (in the case of a non-compressive sensing—FIG. 2A) either the current output value (in the case of a compressive sensing—FIG. 2B). The read circuits form, together, a read stage 105 of the sensor. In the example of FIG. 1, sensor 100 further comprises, downstream of each read circuit (READ), a circuit (NUM) of digitization of the analog values read by the read circuit. The digitizing circuits, respectively arranged at the foot of columns $C_1$ to $C_{16}$, form, together, a sensor digitization stage 107.

In this example, in the compressive sensing of an image, it is provided to use groups of pixels belonging to a same column of the sensor as measurement supports. The different measurement supports used in an acquisition preferably all have the same number of pixels. Each measurement support may comprise either all the pixels of a column, or a subset of pixels of a column. In the example of FIG. 1, each column is divided into four measurement supports each comprising four pixels evenly distributed along the entire height of the column. More particularly, in the shown example, each column comprises a first measurement support formed by the pixels of rows R1, R5, R9, and R13, a second measurement support formed by the pixels of rows R2, R6, R10, and R14, a third measurement support formed by the pixels of rows R3, R7, R11, and R15, and a fourth measurement support formed by the pixels of rows R4, R8, R12, and R16.

Sensor 100 comprises a circuit 109 capable of pseudo-randomly generating sets of binary weighting coefficients to be applied to the measurement supports in a compressive sensing. In this example, pseudo-random generator 109 receives a clock signal CLK, and is capable of periodically generating (at the frequency of signal CLK) a pseudo-random word rand of four binary coefficients rand(1), rand(2), rand(3), and rand(4). More generally, it may be provided to size the pseudo-random generator to generate words of binary coefficients comprising a number of coefficients equal to the number of pixels of the measurement supports used in the compressive sensing. The use of a pseudo-random generator, that is, a generator having a predictive behavior, has the advantage of enabling, at the time of the reconstruction of the original image, to generate for a second time the same coefficients as those which have been used in the compressive sensing. The original image can thus be reconstructed without having to transmit, at the same time as the compressed image, the weighting coefficients used in the sensing.

According to an aspect of the described embodiments which advantageous due its easy implementation, the binary coefficients generated by pseudo-random generator 109 are directly used as activation (or non-activation) signals for the rows of pixels of array 103.

In the example of FIG. 1, sensor 100 comprises a sequential demultiplexer 111 receiving the same clock signal CLK as pseudo-random generator 109, capable of successively applying to the different measurement supports of the sensor different words rand of weighting coefficients generated by generator 109. In this example, demultiplexer 111 comprises four inputs respectively connected to outputs rand(1), rand(2), rand(3), and rand(4) of pseudo-random generator 109, and sixteen outputs respectively connected to rows R1 to R16 of array 103. Demultiplexer 111 is for example configured to successively apply four different words rand to the four above-mentioned groups of four rows defining the sensor measurement supports. The architecture of FIG. 1 enables to simultaneously read (in parallel) one measurement per column of array 103.

It should be noted that it may be useful at read stage 105 to know, for each measurement performed on the sensor, the number of pixels of the measurement support which have been simultaneously activated in read mode. This particularly enables to normalize the different measurements performed on the sensor, for example by applying to each measurement a gain reversely proportional to the number of pixels of the support activated during the measurement. In this example, sensor 100 comprises an adder circuit 113 receiving output values rand(1), rand(2), rand(3), and rand (4) of pseudo-random generator 109 and adding these values to deliver at output stage 105 a value equal to the number of pixel simultaneously activated in read mode on the measurement support.

An advantage of the embodiments described in relation with FIGS. 1, 2A, and 2B is that the provided architecture exhibits very few structural modifications with respect to a standard CMOS sensor using no compressive sensing. In particular, the internal structure of the pixel array is unchanged. Further, the sensor comprises no circuit specifically dedicated to the adding of output values of a plurality of sensor pixels, the sums being performed directly on output tracks 211 of the sensor.

Figure 3:
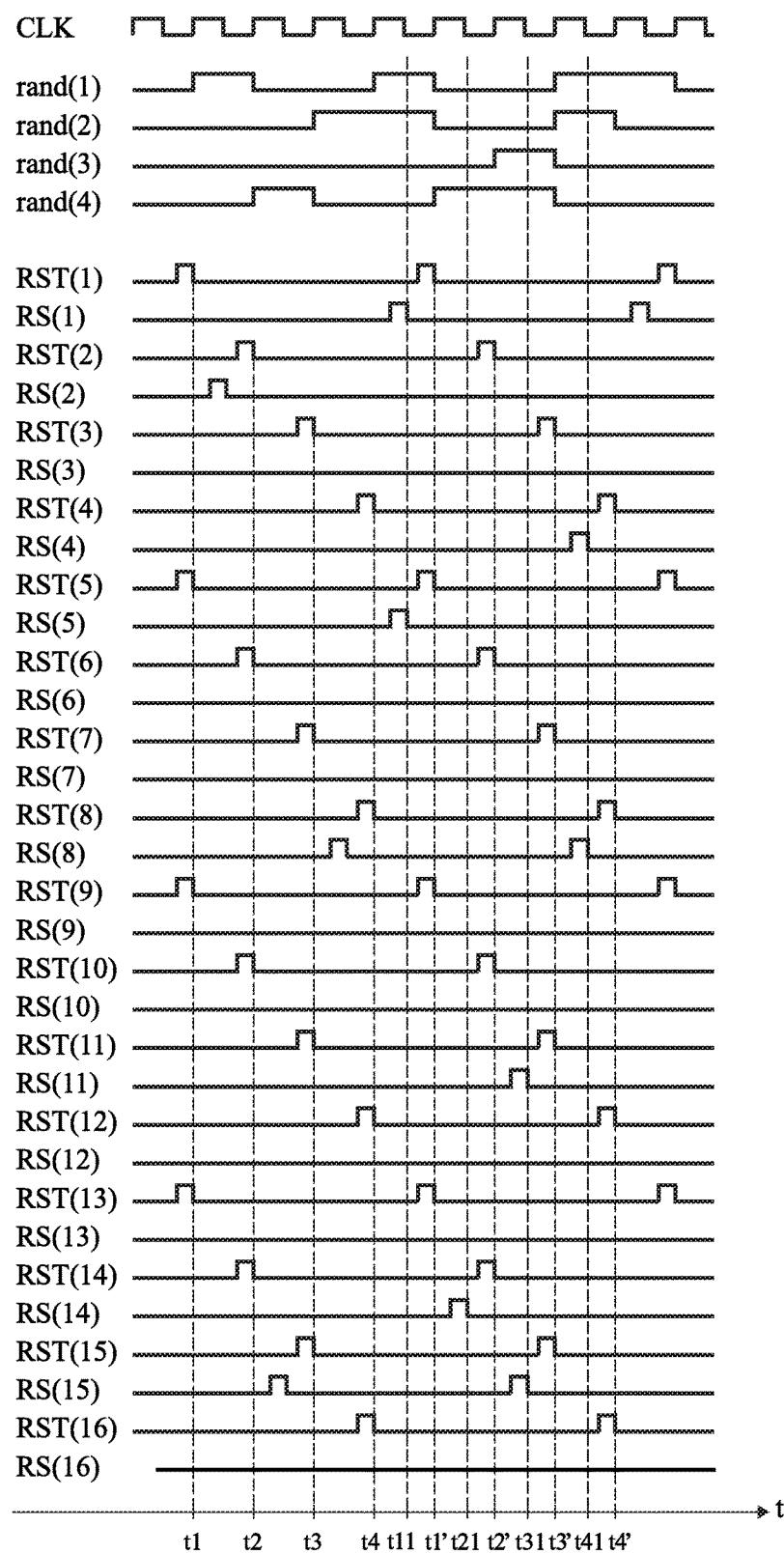
FIG. 3 is a timing diagram showing the time variation of signals internal to the sensor of FIG. 1, according to an example of operation of this sensor.

FIG. 3 is a timing diagram illustrating in further detail an example of a compressive sensing method capable of being implemented by sensor 100 of FIG. 1. FIG. 3 shows the time variation of clock signal CLK of pseudo-random generator 109, of output signals rand(i), with i being an integer in the range from 1 to 4 in this example, of pseudo-random generator 109, and of reset and read control signals RST(j) and RS(j), with j being an integer ranging from 1 to 16 in this example, of the pixels of rows $R_j$ of array 103.

As appears in the drawing, on each rising edge of signal CLK, word rand generated by pseudo-random generator 109 is updated.

At a time t1, an integration phase of the pixels of rows $R_1$, $R_5$, $R_9$, and $R_{13}$ of the sensor starts. This integration phase is preceded by a phase of resetting these pixels by application of a positive pulse on control signals RST(1), RST(5), RST(9), and RST(13). Time t1 coincides with the falling edge of the reset pulse.

At a time t2 subsequent to time t1, an integration phase of the pixels of rows $R_2$, $R_6$, $R_{10}$, and $R_{14}$ starts, preceded with a phase of resetting these pixels by application of a positive pulse on control signals RST(2), RST(6), RST(10), and RST(14). Time t2 coincides with the falling edge of the reset pulse.

At a time t3 subsequent to time t2, an integration phase of the pixels of rows $R_3$, $R_7$, $R_{11}$, and $R_{15}$ starts, preceded by a phase of resetting these pixels by application of a positive pulse on control signals RST(3), RST(7), RST(11), and RST(15). Time t3 coincides with the falling edge of the reset pulse.

At a time t4 subsequent to time t3, an integration phase of the pixels of rows $R_4$, $R_8$, $R_{12}$, and $R_{16}$ starts, preceded by a phase of resetting these pixels by application of a positive pulse on control signals RST(4), RST(8), RST(12), and RST(16). Time t4 coincides with the falling edge of the reset pulse.

Thus, at the scale of a column, in each measurement support, integration phases of the pixels of the support start simultaneously, and the integration phases of pixels of different supports start in delayed fashion. This delay enables, at the end of the integration, to successively read, from output track 211 common to all the column pixels, the output values of the different measurement supports of the column, with a same integration time for all the column pixels.

At a time t11 subsequent to time t1, corresponding to the end of an integration phase of the first support, an output value is read from each column output track 211 of the sensor. In each column, the read output value is representative of the sum, weighted by coefficients rand(1), rand(2), rand(3), and rand(4), of the output values of the pixels of the column located on rows $R_1$, $R_5$, $R_9$, and $R_{13}$, respectively. To achieve this, the activation in read mode of rows $R_1$, $R_5$, $R_9$, and $R_{13}$ is conditioned by the value of coefficients rand(1), rand(2), rand(3), and rand(4), respectively. In the shown example, at time t11, signals rand(1) and rand(2) are in the high state, and signals rand(3) and rand(4) are in the low state. Rows $R_1$ and $R_5$ are thus simultaneously activated in read mode, by application of a positive pulse on control signals RS(1) and RS(5), and the other sensor rows are deactivated (corresponding signals RS(j) in the low state).

At a time t1', subsequent to time 01, rows $R_1$, $R_5$, $R_9$, and $R_{13}$ may be reset by application of a positive pulse on control signals RST(1), RST(5), RST(9), and RST(13), and a new integration phase can start for the acquisition of a new image.

At a time t21 subsequent to time t2, corresponding to the end of an integration phase of the second support, an output value is read from each column output track 211 of the sensor, representative of the sum, weighted by coefficients rand(1), rand(2), rand(3), and rand(4), of the output values of the pixels of the column located on rows $R_2$, $R_6$, $R_{10}$, and $R_{14}$ respectively. In the shown example, at time t21, signals rand(1), rand(2), and rand(3) are in the low state, and signal rand(4) is in the high state. Only row $R_{14}$ is thus activated in read mode, by application of a positive pulse on control signal RS(14), and the other sensor rows are deactivated (corresponding signals RS(j) in the low state).

At a time t2', subsequent to time t21, rows $R_2$, $R_6$, $R_{10}$, and $R_{14}$ may be reset by application of a positive pulse on control signals RST(2), RST(6), RST(10), and RST(14), and a new integration phase can start for the acquisition of a new image.

At a time t31 subsequent to time t3, corresponding to the end of an integration phase of the third support, an output value is read from each column output track 211 of the sensor, representative of the sum, weighted by coefficients rand(1), rand(2), rand(3), and rand(4), of the output values of the pixels of the column located on rows $R_3$, $R_7$, $R_{11}$, and $R_{15}$ respectively. In the shown example, at time t31, signals rand(1) and rand(2) are in the low state, and signals rand(3) and rand(4) are in the high state. Rows $R_{11}$ and $R_{15}$ are thus simultaneously activated in read mode, by application of a positive pulse on control signals RS(11) and RS(15), and the other sensor rows are deactivated (corresponding signals RS(j) in the low state).

At a time t3', subsequent to time t31, rows $R_3$, $R_7$, $R_{11}$, and $R_{15}$ may be reset by application of a positive pulse on control signals RST(3), RST(7), RST(11), and RST(15), and a new integration phase can start for the acquisition of a new image.

At a time t41 subsequent to time t4, corresponding to the end of an integration phase of the fourth support, an output value is read from each column output track 211 of the sensor, representative of the sum, weighted by coefficients rand(1), rand(2), rand(3), and rand(4), of the output values of the pixels of the column located on rows $R_4$, $R_8$, $R_{12}$, and $R_{16}$, respectively. In the shown example, at time t41, signals rand(1) and rand(2) are in the high state, and signals rand(3)

and rand(4) are in the low state. Rows $R_4$ and $R_8$ are thus simultaneously activated in read mode, by application of a positive pulse on control signals RS(11) and RS(15), and the other sensor rows are deactivated (corresponding signals RS(j) in the low state).

At a time t4', subsequent to time t41, rows $R_4$, $R_8$, $R_{12}$, and $R_{16}$ may be reset by application of a positive pulse on control signals RST(4), RST(8), RST(12), and RST(16), and a new integration phase can start for the acquisition of a new image.

In the example of FIG. 3, the above-mentioned times appear in the following order: t1, t2, t3, t4, t11, t1', t21, t2', t31, t3', t41, t4', with t11−t1=t21−t2=t31−t3=t41−t4. The described embodiments are however not limited to this specific sequence.

In the example of FIG. 3, each column of the sensor is divided into four measurement supports and, on acquisition of an image, for each measurement support, a single output value is read and digitized. This results in a decrease (compression) of the quantity of data at the sensor output by a factor four with respect to an acquisition of an entire image (one output value per pixel). This further results in a decrease by a factor four of the image acquisition time (reading and digitization of all the output values) with respect to an acquisition of an entire image with a row-by-row reading of the pixels.

Such an acquisition method has the advantage of significantly increasing the image acquisition speed with respect to prior art architectures using compressive sensing. This is particularly advantageous for fast imaging applications for which the acquisition time is a critical parameter. In particular, the embodiments described in the present application are particularly adapted to the detection of transient phenomena when the constraints in terms of detection time resolution and electric power consumption are harsh. Another advantage of the embodiments described in the present application is that they enable, on acquisition of a video sequence, to easily interpose non-compressed frames (images) in the sequence, which may ease the reconstruction of the compressed images.

Another important aspect of the embodiments described in the present application in that, during the compressive sensing of an image, all the pixels of a same measurement support are initialized at the same time, that is, the integration periods of the pixels of a same support coincide. This has the advantage of giving time consistency to the measurements, which is for example particularly advantageous when the observed scene is moving. This is a difference with prior art compressive sensing architectures and methods, where the pixels of a same measurement support are integrated for identical times, delayed with respect to one another.

Figure 4:
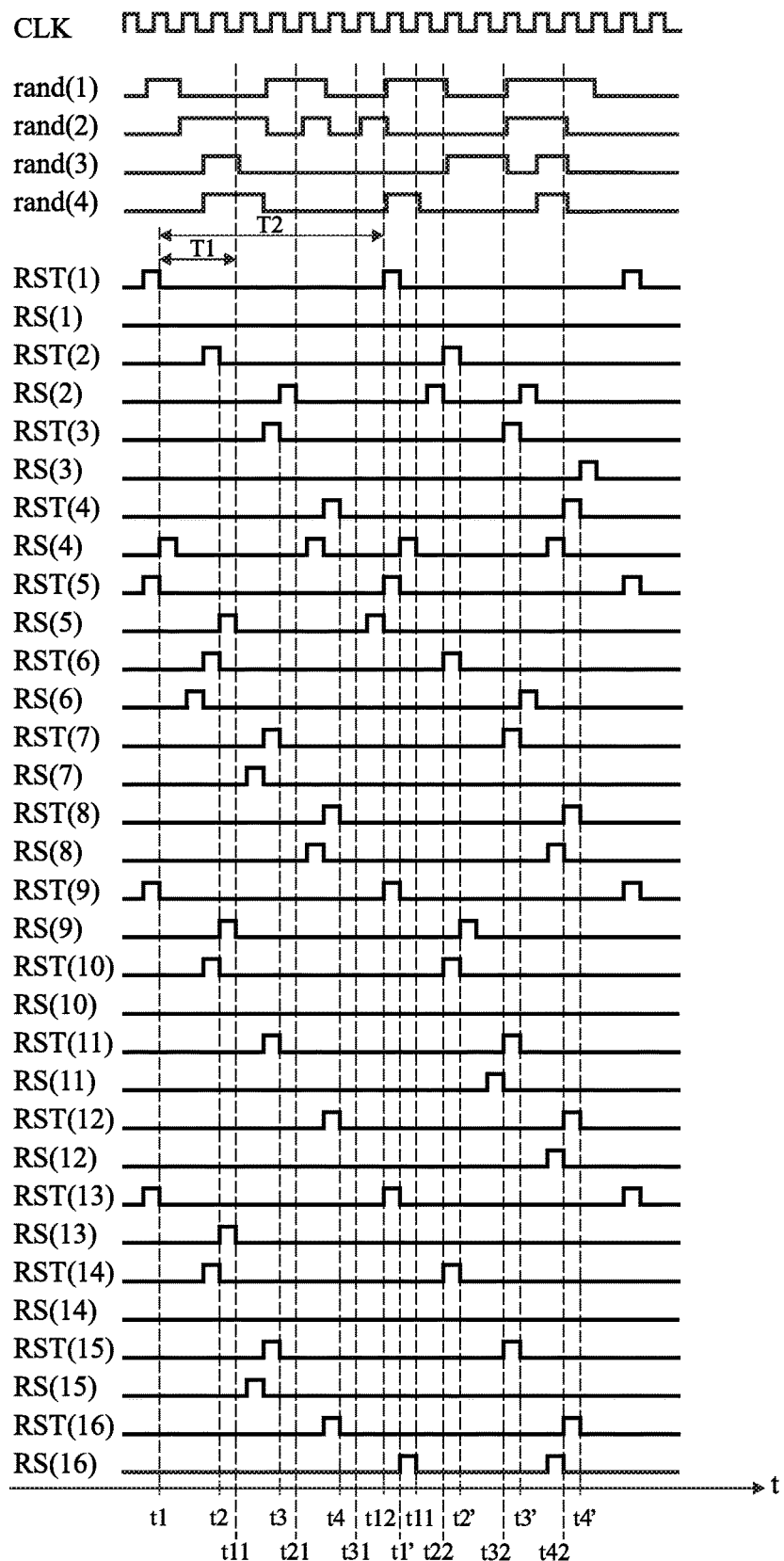
FIG. 4 is a timing diagram showing the time variation of signals internal to the sensor of FIG. 1, according to another example of operation of this sensor.

FIG. 4 is a timing diagram illustrating another example of a compressive sensing method capable of being implemented by sensor 100 of FIG. 1. FIG. 4 shows the time variation of clock signal CLK of pseudo-random generator 109, of output signals rand(i), with i being an integer in the range from 1 to 4 in this example, of pseudo-random generator 109, and of reset and read control signals RST(j) and RS(j), with j being an integer ranging from 1 to 16 in this example, of the pixels of rows $R_j$ of array 103.

In this example, it is provided, on acquisition of an image, to read and digitize, for each measurement support, a plurality of output values (two in the shown example, but this number may be greater) corresponding to different integration times of the pixels of the support, without resetting the support between two successive read operations.

As in the example of FIG. 3, an integration phase of the pixels of rows $R_1$, $R_5$, $R_9$, and $R_{13}$ of the sensor starts at a time t1, an integration phase of the pixels of rows $R_2$, $R_6$, $R_{10}$, and $R_{14}$ starts at a time t2 subsequent to time t1, an integration phase of the pixels of rows $R_3$, $R_7$, $R_{11}$, and $R_{15}$ starts at a time t3 subsequent to time t2, and an integration phase of the pixels of rows $R_4$, $R_8$, $R_{12}$, and $R_{16}$ starts at a time t4 subsequent to time t3.

At a time t11 subsequent to time t1, an output value corresponding to a first integration time T1 (T1=t11−t1) is read from each column output track 211 of the sensor. In each column, the read value is representative of the sum, weighted by coefficients rand(1), rand(2), rand(3), and rand(4), of the values of the pixels of the column located on rows $R_1$, $R_5$, $R_9$, and $R_{13}$, respectively. In the shown example, at time t11, signals rand(1) is in the low state, and signals rand(2), rand(3), and rand(4) are in the high state. Rows $R_5$, $R_9$, and $R_{13}$ are thus simultaneously activated in read mode, by application of a positive pulse on control signals RS(5), RS(9), and RS(13), and the other rows are deactivated (corresponding signals RS(j) in the low state).

At a time t12 subsequent to time t11, another output corresponding to a second integration time T2 (T2=t12−t1) is read from each column output track 211 of the sensor, representative of the sum, weighted by coefficients rand(1), rand(2), rand(3), and rand(4), of the output values of the pixels of the column located on rows $R_1$, $R_5$, $R_9$, and $R_{13}$, respectively. In the shown example, at time t12, signals rand(2) is in the high state, and signals rand(1), rand(3), and rand(4) are in the low state. Only row $R_5$ is thus activated in read mode, by application of a positive pulse on control signal RS(5), and the other sensor rows are deactivated (corresponding signals RS(j) in the low state). Between times t1 and t12, rows $R_1$, $R_5$, $R_9$, and $R_{13}$ are not reset.

At a time t1', subsequent to time t12, rows $R_1$, $R_5$, $R_9$, and $R_{13}$ may be reset by application of a positive pulse on control signals RST(1), RST(5), RST(9), and RST(13), and a new integration phase can start for the acquisition of a new image.

Similarly:

At times t21, subsequent to time t2, and t22, subsequent to time t21, output values of the supports formed by rows $R_2$, $R_6$, $R_{10}$, and $R_{14}$ are read from column output tracks 211 of the sensor, these values respectively corresponding to first integration time T1 (t21=t2+T1) and to second integration time T2 (t22=t2+T2), and rows $R_2$, $R_6$, $R_{10}$, and $R_{14}$ are not reset between times t2 and t22. At a time t2' subsequent to time t22, rows $R_2$, $R_6$, $R_{10}$, and $R_{14}$ may be reset for the integration of a new image.

At times t31, subsequent to time t3, and t32, subsequent to time t31, output values of the supports formed by rows $R_3$, $R_7$, $R_{11}$, and $R_{15}$ are read from column output tracks 211 of the sensor, these values respectively corresponding to first integration time T1 (t31=t3+T1) and to second integration time T2 (t32=t3+T2), and rows $R_3$, $R_7$, $R_{11}$, and $R_{15}$ are not reset between times t3 and t32. At a time t3' subsequent to time t32, rows $R_3$, $R_7$, $R_{11}$, and $R_{15}$ may be reset for the integration of a new image.

At times t41, subsequent to time t4, and t42, subsequent to time t41, output values of the supports formed by rows $R_4$, $R_8$, $R_{12}$, and $R_{16}$ are read from column output tracks 211 of the sensor, these values respectively corresponding to first integration time T1 (t41=t4+T1) and to second integration time T2 (t42=t4+T2), and rows $R_4$, $R_8$, $R_{12}$, and $R_{16}$ are not reset between times t4 and t42. At a time t4' subsequent to time t42, rows $R_4$, $R_8$, $R_{12}$, and $R_{16}$ may be reset for the integration of a new image.

In the example of FIG. 4, the above-mentioned times appear in the following order: t1, t2, t11, t3, t21, t4, t31, t12, t1', t41, t22, t2', t32, t3', t42, t4'. The described embodiments are however not limited to this specific sequence.

The embodiment described in relation with FIG. 4 enables, by providing to perform a plurality of measurements at different integration times, to reconstruct images having a wide dynamic range. This is particularly advantageous in the case of high-contrast scenes. It should be noted that if, during a measurement, saturated pixels of the measurement support are activated in read mode, these saturated pixels generate a zero current on output track 211 of the support, and thus have no effect on the measurement. Thus, saturated pixels are automatically excluded from the measurement, which has the advantage of easing the reconstruction of images having a wide dynamic range. It should further be noted that wide dynamic range image reconstruction methods may take advantage of a possible non-linearity of the pixel response to extend the dynamic range of the reconstructed image.

An advantage of the embodiment of FIG. 4 is that it can enable to do away with a feedback loop on the integration time. Advantage may particularly be taken from the lesser constraints on the analog-to-digital conversion and on the read circuits to acquire a plurality of images originating from different integration times in compressed mode.

Figure 5:
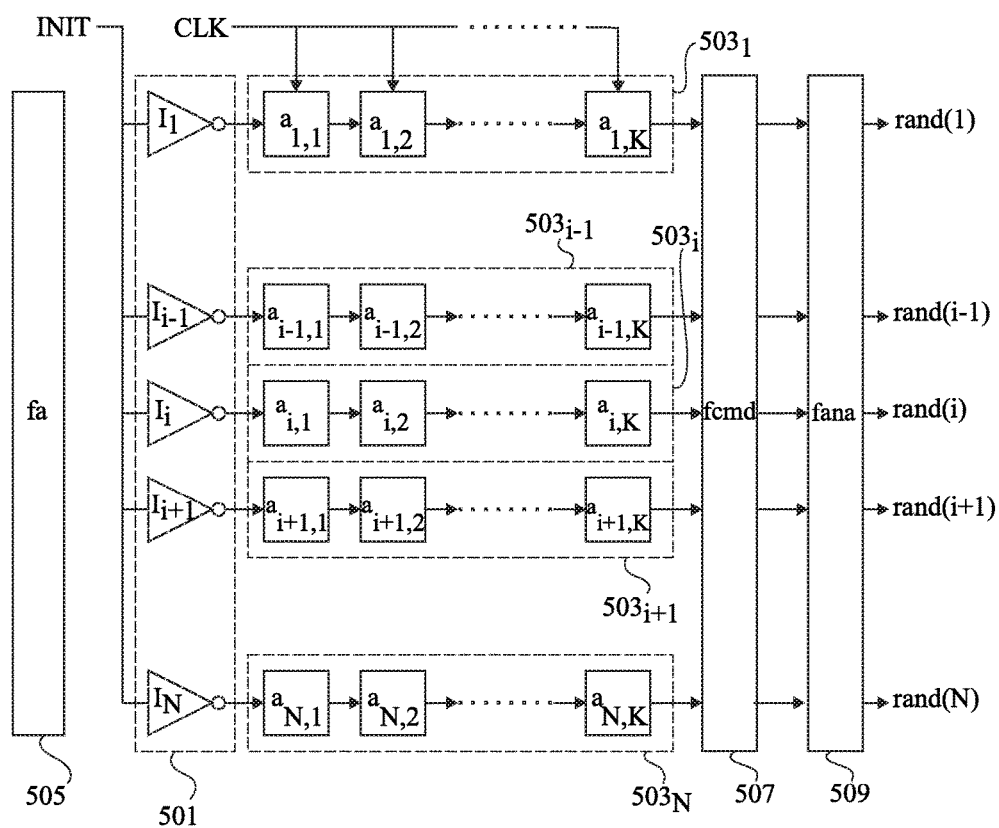
FIG. 5 schematically shows in the form of blocks an embodiment of a pseudo-random binary word generator capable of being used in the sensor of FIG. 1.

FIG. 5 schematically shows in the form of blocks an embodiment of a pseudo-random binary word generator capable of being used in a sensor of the type described in relation with FIG. 1.

The generator of FIG. 5 is a cellular automaton with a chaotic behavior capable of periodically generating, at the frequency of a clock signal CLK, a pseudo-random word rand of N binary coefficients rand(i), where N is an integer and i is an integer ranging from 1 to N.

This generator comprises an initialization stage 501, comprising N elements $I_i$ all receiving a same logic initialization signal INIT. Each element $I_i$ comprises an inverter, and is configurable to invert or not to invert signal INIT, to provide, at the output of initialization stage 501, an N-type initialization pattern. It should be noted that the embodiment of FIG. 5 is not limited to this specific example of initialization stage. It will be within the abilities of those skilled in the art to provide other circuits capable of providing an N-bit initialization pattern.

The generator of FIG. 5 further comprises N shift registers $503_j$, receiving as an input the N bits of the initialization pattern, and providing as an output N pseudo-random linear values. In this example, each shift register $503_j$ comprises K delay cells K being an integer and j being an integer ranging from 1 to K. Thus, the generator of FIG. 5 comprises an array of delay cells with N rows of index i and K columns of index J.

In the shown example, on initialization of the automaton, the initialization pattern provided by initialization stage 501 is stored in the column of index j=1 of the shift structure.

On each rising or falling edge of clock signal CLK, the N-bit word stored in each column of index j of the array is transferred to the next column of index j+1, except for the word stored in the column index j=K which is transferred to the output of the array of delay cells. In the column of index j=1, each cell $a_{i,1}$ (with i ranging from 1 to N) is updated by a transition stage 505 implementing a transition function or automaton function fa of the generator. In the example of FIG. 5, for each cell $a_{i,1}$ of the column of index j=1, the transition function is used to calculate a new value of the cell based on the cell values of the column of index j=2, that is, the values that the cells of the column of index j=1 had at the previous clock edge. As an example, transition function fa of the generator may be such that:

$$a_{i,1} = \text{XOR}(\text{OR}(a_{i+1,2}, a_{i,2}), a_{i-1,2}).$$

Where XOR designates the XOR logic function and OR designates the OR logic function. The embodiment of FIG. 5 is however not limited to this specific transition function.

After a number of updates of the automaton, the N-bit words at the output of the column of index j=K of the delay cell array has pseudo-random properties.

According to an aspect of the embodiment of FIG. 5, the pseudo-random generator further comprises, at the output of the shift structure, a stage 507 for adapting the generator expectation.

Indeed, in the example of FIG. 5, at the output of the last column of the array (the column of index j=K), the generator expectation is ½, that is, for each shift register $503_j$ of the structure, the probability, for a drawing, of having a register output value equal to 1, is ½.

However, in certain cases, it may be advantageous to decrease the output expectation of a pseudo-random generator. In particular, in the sensor of FIG. 1, if the measurement supports comprise a relatively high number N of pixels, it may be desirable to decrease the output expectation of the pseudo-random generator to avoid having, during a measurement, too high a number of pixels of the support simultaneously activated in read mode, which might be a problem for the reading of the output value of the support, or even damage the sensor.

Stage 507 implements an expectation decrease function fcmd which, for each state switching of the automaton, generates a pseudo-random word of N bits of expectation smaller than ½, based on values contained in the delay cell array. For each row of the cell array, function fcmd generates a value fcmd(i) based on the values of various cells of the array. Function fcmd is for example such that:

$$fcmd(i) = \text{AND4}(a_{i-1,K}, a_{i-1,K-1}, a_{i,K-2}, a_{i,K}),$$

where AND4 designates the four-input AND logic function. The embodiment of FIG. 5 is however not limited to this specific expectation adaptation function.

An analog output state 509 (fana) may further be provided at the output of expectation adaptation stage 507 to adapt the voltage levels of the logic signals provided by stage 507. In the shown example, stage 509 provides N pseudo-random binary signals rand(1) to rand(N) capable of being processed to implement the compressive sensing of an image in the sensor of FIG. 1.

As an example, in the case of a CMOS sensor of the type described in relation with FIG. 1 having an array of 512 rows by 512 columns, the implementation of a compressive sensing based on measurement supports each comprising 64 pixels located on a same column of the sensor (each column is thus divided into 8 measurement supports) may be provided. In this case, word rand generated by the pseudo-random generator may comprise 64 binary coefficients. To generate word rand, a pseudo-random generator of the type described in relation with FIG. 5, comprising an array of delay cells comprised of 64 rows (N=64) and 3 columns (K=3) may be provided.

It should be noted that the pseudo-random generator of FIG. 5 may advantageously be used in other devices than the CMOS sensor of FIG. 1. In particular, the pseudo-random generator of FIG. 5 may advantageously be used in any CMOS sensor architecture implementing compressive sensing methods. More generally, the pseudo-random generator of FIG. 5 may advantageously be used in any application capable of taking advantage of a decrease of the expectation of a pseudo-random signal.

It should further be noted that the sensor of FIG. 1 is not limited to the use of a pseudo-random generator of the type described in relation with FIG. 5. It will be within the abilities of those skilled in the art to implement the desired operation by using other types of pseudo-random binary coefficient generators.

Specific embodiments have been described. Various alterations, modifications, and improvements will readily occur to those skilled in the art.

In particular, the embodiments described in the present application are not limited to the specific example of pixel structure of FIGS. 2A and 2B. It will be within the abilities of those skilled in the art to obtain the desired operation by using other active CMOS pixel structures, for example, structures with four MOS transistors for one photodiode, of the type currently called "4T-pixel". Further, the described embodiments are not limited to pixels formed of N-channel MOS transistors. It will be within the abilities of those skilled in the art to obtain the desired operation by using pixels based on P-channel MOS transistors, or pixels comprising both N-channel MOS transistors and P-channel MOS transistors.

Further, the described embodiments are not limited to the specific example of arrangement of the pixels on the sensor described in relation with the drawings. It will be within the abilities of those skilled in the art to implement the desired operation by using other pixel arrangements on the sensor, and particularly non-array arrangements.

Further, the described embodiments are not limited to the specific example of arrangement of the compressive sensing measurement supports on the sensor described in relation with the drawings. It will be within the abilities of those skilled in the art to implement the desired operation by using measurement supports having their pixels arranged other than in a column. As an example, the pixels of the measurement supports may be arranged in a row, in an array, or according to any other arrangement, provided that the pixels of a same measurement support share a same output conductive track.

Further, the described embodiments are not limited to the specific example described in relation with the drawings, where the sensor pixels are simultaneously controllable in rows.

It should be noted that in the example described in relation with FIGS. 1, 2A, and 2B, the sensor can easily be configured to perform compressive sensing measurements based on measurement supports arranged in a row. To achieve this, it may be provided to connect the nodes P of all the pixels of a same row to a same row biasing conductive track, and to connect the nodes P of the pixels of different rows to different row biasing conductive tracks (not shown in the drawings). To perform a compressive sensing based on measurement supports arranged in a column, one may then, as described hereabove: apply voltage $V_{POL+}$ to all the sensor columns and apply voltage $V_{POL-}$ to all the sensor rows; activate, via signals RS(j), the rows which are desired to be simultaneously activated in read mode; and read the output values of the measurements supports, in current mode, on column output conductive tracks 211 of the sensor. To perform a compressive sensing based on measurement supports arranged in a row, one may: apply voltage $V_{POL-}$ to all the sensor rows; apply a read activation signal RS(j) to all the sensor rows; only apply voltage $V_{POL+}$ to the sensor rows which are desired to be simultaneously activated in read mode, and apply a low voltage, for example, voltage $V_{POL-}$ or voltage GND, to the other columns; and read the output values of the measurements supports, in current mode, from the row biasing conductive tracks of the sensor.

If a configuration of this type is provided, it is further possible to combine, on acquisition of a same video sequence or on acquisition of a same image (for example, in the case of a multiple-acquisition method of the type described in relation with FIG. 4), compressive sensing methods based on supports arranged in a row.

Further, the embodiments described in the present disclosure are compatible with monochromatic CMOS sensors as well as with color CMOS sensors. As an example, in the case of a color sensor, color filters arranged according to a Bayer-type pattern, be it repetitive or not, may be arranged above the sensor photodiodes.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed:

1. A CMOS image sensor comprising:
   a plurality of pixel arranged in a plurality of subsets, each said subset defining a measurement support; and
   a circuit capable of implementing a comprehensive image sensing method, the method comprising:
   for a given integration time of the sensor pixels, reading, for each measurement support, a single output value, said single output value being a weighted sum of the output values of the pixels of the support, the weighting coefficients being binary pseudo-randomly generated coefficients.

2. The sensor of claim 1, wherein, on implementation of said compressive sensing method, the integration periods of the pixels of a same measurement support coincide in time.

3. The sensor of claim 1, wherein said single output value is representative of the sum of the output values of said one or a plurality of selected pixels of the support.

4. The sensor of claim 1, wherein pixels of different measurement supports are connected to different output conductive tracks.

5. The sensor of claim 1, wherein the pixels are active pixels, each comprising a photodetector and an active output amplifier comprising MOS transistors.

6. The sensor of claim 1, wherein each pixel comprises one photodiode and three MOS transistor.

7. The sensor of claim 1, wherein said compressive sensing method comprises, for each measurement support, reading at least two output values corresponding to different integration times of the pixels of the support, where the support pixels are not reset between said at least two read operations, to enable to reconstruct an image a wide dynamic range.

8. The sensor of claim 1, comprising of a generator of pseudo-random binary coefficients, and a control circuit capable of performing said pseudo-random selection of one or a plurality of pixels of the support based on the coefficients provided by said generator.

9. The sensor of claim 8, wherein the generator comprises a stage for decreasing an output expectation function of the generator.

10. The sensor of claim 1, wherein all the pixels of the same measurement support are connected to a same output conductive track.

11. The sensor of claim 10, wherein, on implementation of said comprehensive sensing method, the sensor pixels are configured so that, when a plurality of pixels of a same support are simultaneously activated in read mode, a quantity representative of the sum of the output values of the activated pixels can be read from the output track common to the pixels of the support.

12. The sensor of claim 11, wherein said quantity is current.

13. The sensor of claim 11, wherein each output track of the sensor is connected to a circuit (READ) for reading said quantity.

14. The sensor of claim 1, wherein the sensor pixels are arranged in an array, and wherein all the pixels of a same measurement support belong to a same column of the array.

15. The sensor of claim 14, wherein all the pixels of a same column are coroneted to a same output conductive track.

16. The sensor of claim 14, wherein each column of the array comprises a plurality of separate measurements supports.

17. The sensor of claim 16, wherein the pixels of each measurement support are evenly distributed along the entire height of the column to which the support belongs.

18. A method of compressive sensing of an image by a CMOS image sensor comprising a plurality of pixels distributed in a plurality of subsets, each subset defining a measurement support, the method comprising:
for a given integration time of the sensor pixels, reading, for each measurement support, a single output value, said single output value being a weighted sum of the output values of the pixels of the support, the weighting coefficients being binary pseudo-randomly generated coefficients.

19. The method of claim 18, comprising, for each measurement support, reading at least two output values corresponding to different integration times of the support pixels, where the support pixels are not reset between said at least two read operations, to enable to reconstruct an image having a wide dynamic range.

20. The method of claim 18, wherein the integration periods of the pixels of a same measurement support coincide in time.

* * * * *